April 1, 1952 J. D. BALDWIN, JR., ET AL 2,591,495
HAND BRAKE ASSEMBLY
Filed Dec. 22, 1950 2 SHEETS—SHEET 1
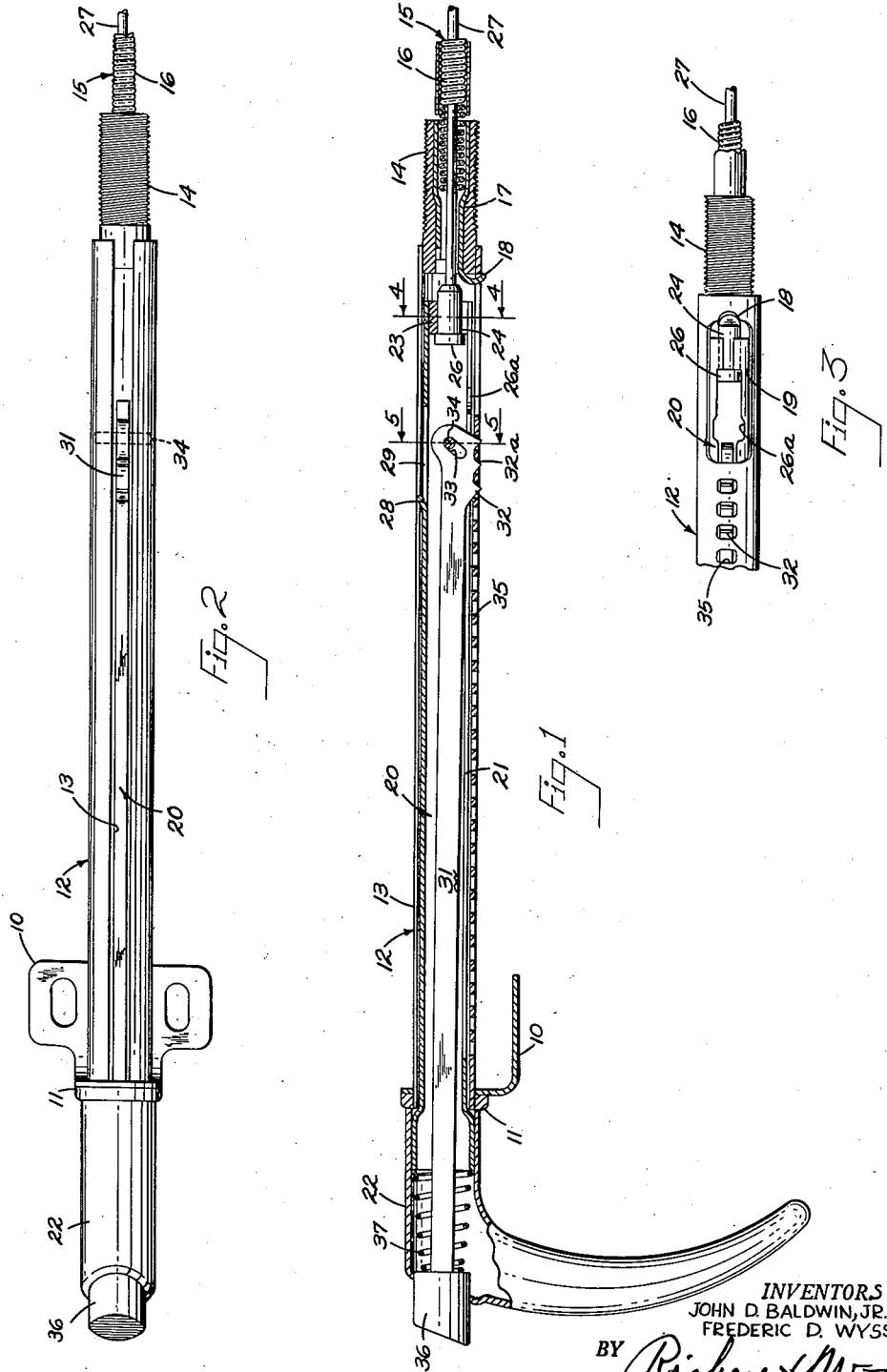
INVENTORS
JOHN D. BALDWIN, JR. &
FREDERIC D. WYSS.
BY Richey + Watts
ATTORNEYS April 1, 1952   J. D. BALDWIN, JR., ET AL   2,591,495
HAND BRAKE ASSEMBLY
Filed Dec. 22, 1950

INVENTORS
JOHN D. BALDWIN, JR. &
FREDERIC D. WYSS.
BY Richey & Watts
ATTORNEYS

Patented Apr. 1, 1952

2,591,495

UNITED STATES PATENT OFFICE 2,591,495

HAND BRAKE ASSEMBLY

John D. Baldwin, Jr., Highland Heights, and Frederic D. Wyss, Cleveland Heights, Ohio, assignors to The Weatherhead Company, Cleveland, Ohio, a corporation of Ohio Application December 22, 1950, Serial No. 202,308

7 Claims. (Cl. 74—503)

This invention relates to operating mechanism, and, although it may find applications in other fields, it has been particularly designed for the application of brakes such as the parking and emergency brakes of the type currently fitted to passenger and similar vehicles.

The type of brake-operating mechanism to which this invention relates is one wherein a flexible tension wire connection is made to the brake mechanism or other operated device which includes a relatively strong releasing spring, the other end of the wire being connected to a pull rod or handle and incorporating an automatic ratchet or latch means so arranged that the brakes may be applied for parking or emergency purposes by merely exerting the necessary pulling force upon the handle.

Various means for releasing the operating mechanism have been devised, including means wherein the mechanism is released by turning the handle, and means have also been proposed that are released by manipulating a button or the like mounted on the handle. A principal object of the invention resides in providing a button-release type of brake wherein the brake release cannot be affected accidentally, that is, by ordinary pressure against the button, such release only being normally possible by simultaneously pulling on the handle in the brake application direction and operating the brake-release mechanism or button.

Another object resides in prolonging the life and increasing the wearing qualities of the latch or ratchet mechanism. Those familiar with the action of ratchet locks are aware that the pawl teeth and mating surfaces of the ratchet, no matter how well hardened and tempered they may be, are subject to exceedingly high unit loads and rapid wear and breakage. It is a relatively simple and well-known expedient to provide a ratchet-type latch wherein the teeth are undercut members having sections of less than 90° so that the main brake or other mechanism spring must be released by a pull on the applicator in order to release the latch. Although this type of construction may prevent accidental release of the brake or applied device when the apparatus is new, when undercut or sharp-edged teeth are employed such teeth are subject to rapid wear and are fragile and are readily broken so that any safety features that are present when the apparatus is new are soon lost.

It is a feature of applicants' construction that a long-wearing, self-locking pawl and ratchet mechanism is provided that is releasable by a push button only upon retraction of the main brake handle, which mechanism does not require undercut or thin section teeth. It can be supplied with teeth and mating surfaces that are sturdy and not critical as to slight changes in the shape of the teeth and/or mating ratchet surfaces.

Other objects of the invention reside in the reduction of the number of parts required and the simplification thereof, the elimination of the need for more than one spring in the latch mechanism, and the provision of a latch mechanism and thumb-button control which is structurally a one-piece mechanism.

The manner in which these and other objects and advantages may be attained will be apparent from the following detailed description of a preferred embodiment of the invention.

In the drawings:

Fig. 1 is a partially-sectioned side view of the apparatus;

Fig. 2 is a top view thereof;

Fig. 3 is a fragmentary bottom view thereof;

Figure 4:
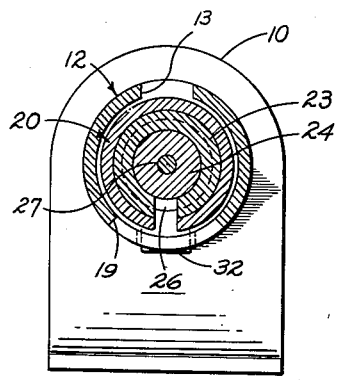
Figs. 4 and 5 are sections taken on 4—4 of Fig. 3 and 5—5 of Fig. 1 respectively.
Figure 5:
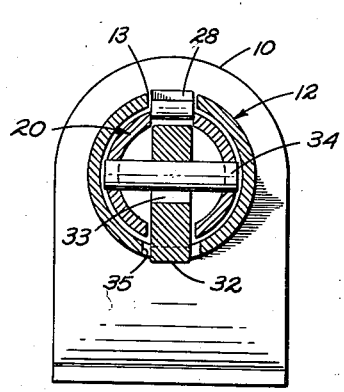

The operating control mechanism, when mounted on the vehicle, is formed with a bracket 10 for mounting on the usual lower flange of the vehicle dash, the bracket being integral with a collar 11 that reinforces a housing or tube 12 that extends forwardly from the back of the vehicle dash. The tube is slotted as at 13 to provide a guide for an inner manually-manipulable control sleeve, and has a threaded thimble as at 14 on the inner end thereof for mounting on a suitable part of the vehicle body by means of nuts or the like (not shown).

The flexible control wire, indicated generally at 15, has a flexible wire sleeve 16 bonded to an attaching sheet metal sleeve 17 which is retained in the thimble 14 by a lip 18 (best seen in Figs. 1 and 3) bent over and projecting through a slot 19 in the bottom of tube 12. The pull mechanism embodies a sheet metal tube 20 bent up to provide a lower slot 21 and welded or otherwise fastened to a sheet metal handle member 22 disposed outside of the dash. The tension member of the wire assembly is mounted by means of a reinforcing collar 23 bonded to the end of the tube 20 which receives the shank 24 of a collar having an abutment head 26, the collar being fastened to the tension wire 27, wire 27 being provided for connection in a manner well known in the art to the brake or other operated mechanism. In order to prevent rotation of the handle within the tube 12 a tongue 28 (seen in Fig. 1) is struck upwardly from the tube 20 and rides in the aforesaid slot 13 formed in the outer sleeve 12.

The releasing and pawl or latch mechanism comprises a bar 31 disposed within the tube 20 and having formed at the inner end and at the lower side thereof three latch teeth 32 having forward inclined locking surfaces 32a. An important feature of the invention is means to guide the latch bar end forwardly and upwardly when the button is depressed, which means in the preferred embodiment of the invention is provided by a slot 33 formed on the latch bar which receives a cross pin 34 mounted at its ends in the tube 20. A plurality of apertures, preferably square or at least having straight forward edges, are formed as at 35 in the bottom of the guide sleeve 12, and are spaced to correspond to the spacing of the latch teeth 32. At the outer end of the latch bar 31 is attached a manual push button 36 convenient for manipulation from the handle 22. The latch button and bar are formed as a unitary assembly and are urged to the left in Fig. 1, which is the latching position, by a coil compression spring 37.

In operation, the brake is applied (or other spring-loaded mechanism operated) in the usual manner by exerting the necessary pull upon the handle 22, whereupon the rearward bevelled surfaces of latch teeth 32 merely ratchet over the edges of apertures 35 in the outer or ratchet sleeve. When the handle is released, forward motion of the tube 20 is arrested by the latch mechanism and the latter can only be unlatched, in normal operation, by simultaneously exerting the necessary pull on the handle 22 to overcome the force of the brake or other spring and depressing the button 36. This safety feature is accomplished even though there are no undercuts or thin section teeth on either the latch mechanism or the mating surfaces of the outer sleeve 12.

Figure 6:
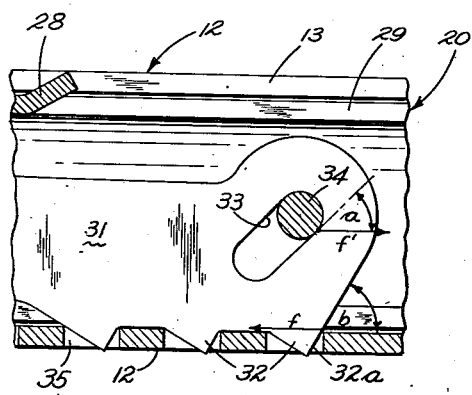
Fig. 6 is an enlarged view of the latch and illustrating the angles and forces involved; and, Fig. 7 is a view similar to Fig. 6 showing a modified form of the invention.

Although a complete force diagram is considered unnecessary, it being a mere matter of static mechanics, the relative dimensions which make the aforesaid action possible can best be understood with reference to Fig. 6. In a typical construction, which is found to prove satisfactory in practice, the angle b in Fig. 6, which is the inclination (relative to the axis of spring pull) of the forward or latching surfaces 32a of the latch teeth, is approximately 60°, whereas the angle a, which is the angle of inclination of slot 33, is a more acute angle, an angle of about 45° being employed in the illustrated embodiment of the invention.

The slot arrangement and the relation of the angles as shown functions as follows: Due to the main brake applicator spring or the like the latch bar 31 is urged against the forward edge of apertures 35 by a force indicated diagrammatically at f in the drawings, this force being due to the pull f' exerted by the pin 34 against the forward edge of the slot 33. Due to the angular relationship shown, it will be apparent that the radial component of the primary force, that is the wedging action of force f', urges the latch downwardly in the drawings and tends to hold the teeth in engagement. When the teeth surfaces 32a are also inclined as in the preferred form, the reaction force f against edge 32a also has a radial component, but this component tends to cam the teeth away from the apertures 35. However, due to the angular relationship described, the unlatching force component is less than the first-mentioned or latching force component, so that the device is held in its latched position by the main operating spring or force exerting means (not shown). In other words, the wedging section of the slot 33 tending to latch the device is more powerful than the wedging action of the surface 32a tending to unlatch it.

This relation has another important feature which comes into play when an attempt is made to operate the latch by means of button 36 without pulling on the handle 32. Pressing on button 36 urges the latch bar 31 to the right in the figure, and due to the guide means for the bar such as the slot 33 and pin 34, in order for the bar to move to the right it must also move upwardly, as seen in the drawings. Due to the superior wedging action of the slot 33 heretofore described, the latch cannot move to the right relative to pin 34 in the guided direction dictated by the disposition of slot 33 without overcoming the force of the main brake applicator spring or its equivalent. Since these springs are ordinarily quite strong, this means that, in effect, the latch cannot be accidentally dislodged in normal use witout exerting a strong pull on the handle 22.

Thus, it will be seen that we have provided a safety latch means to secure against accidental release of the brake or operated device. The teeth are not undercut but may be formed for easily riding over the edges of aperture 35 when the latch is released. Although the teeth are very strong, they are not critical in their action as to the result of slight wear of the teeth, or rounding of the edges of apertures 35. The latch mechanism is a one-piece device and requires but one spring, and no trigger separate from the latch mechanism is necessary to prevent accidental release of the brake.

Figure 7:
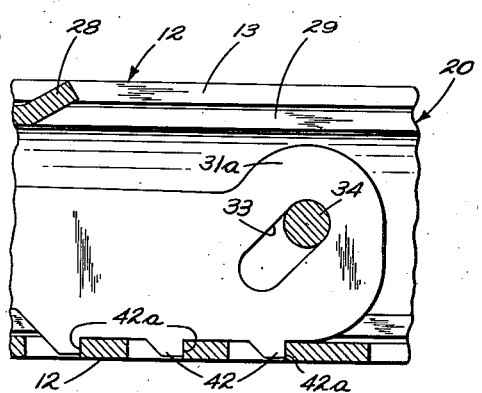

The form shown in Fig. 7 is likewise self-locking and cannot be accidentally unlatched. However, in this form latch bar 31a has formed thereon teeth 42 which have radial forward faces 42a. Here, no camming action at the teeth tending to unlatch the apparatus is present, but there is more tendency for the teeth to catch inadvertently on the ratchet tube 12 during the release operation.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. Operating mechanism comprising a fixed ratchet, an elongated operating member slidable along said ratchet, handle means at the axially outer end of said operating member, a latch bar slidable along said operating member having manual means at the axially outer end thereof for moving the bar axially inwardly, tooth means on said bar spaced axially inwardly from said manual means having axially inner face means inclined at an angle of 90 degrees or less relative to the direction of motion of said operating member and formed for latching with said ratchet, inclined guide means formed on said bar and operating member adjacent said tooth means, said guide means being inclined at an acute angle relative to the direction of motion of said operating member, said acute angle being less than the corresponding angle of inclination of said tooth face means.

2. Operating mechanism comprising a fixed ratchet, an elongated operating member slidable along said ratchet, handle means at the outer end of said operating member, a latch bar slidable along said operating member having manual means at the axially outer end thereof for moving the bar axially inwardly, tooth means on said bar spaced axially inwardly from said manual means having axially inner face means for latching with said ratchet, said face means forming an acute angle relative to the direction of motion of said operating member, inclined guide means formed on said bar and operating member adjacent said tooth means, said guide means being inclined at an acute angle relative to the direction of motion of said operating member, said latter angle being less than the corresponding angle of inclination of said tooth face means, and spring means for urging said latch bar axially outwardly.

3. Operating mechanism comprising a fixed ratchet, an elongated operating member slidable along said ratchet, handle means at the outer end of said operating member, a latch bar slidable along said operating member having manual means at the axially outer end thereof for moving the bar axially inwardly, tooth means on said bar spaced axially inwardly from said manual means having axially inner face means inclined at an angle of 90 degrees or less relative to the direction of motion of said operating member and formed for latching with said ratchet, guide means for said latch bar comprising an inclined slot formed in said bar and receiving a cross-pin mounted in said operating member adjacent said tooth means, said slot being inclined at an acute angle relative to the direction of motion of said operating member, said acute angle being less than the corresponding angle of inclination of said tooth face means, and spring means for urging said latch bar axially outwardly.

4. Operating mechanism comprising a fixed ratchet, an elongated operating member slidable along said ratchet, handle means at the outer end of said operating member, a latch bar slidable along said operating member having manual means at the axially outer end thereof for moving the bar axially inwardly, tooth means on said bar spaced axially inwardly from said manual means having axially inner face means for latching with said ratchet, said face means forming an acute angle relative to the direction of motion of said operating member, guide means for said latch bar comprising an inclined slot formed in said bar and receiving a cross-pin mounted in operating member adjacent said tooth means, said slot being inclined at an acute angle relative to the direction of motion of said operating member, said latter angle being less than the corresponding angle of inclination of said tooth face means, and spring means for urging said latch bar axially outwardly.

5. Operating mechanism comprising an axially slotted tubular member with an axial row of ratchet-forming apertures formed therein, an elongated operating sleeve member slidable within said ratchet and having a tongue slidable in said slot, handle means at the outer end of said operating member, a latch slidably mounted within said operating member and having a manually operable button at the axially outer end thereof for moving the bar axially inwardly, tooth means on said bar spaced axially inwardly from said manual means having axially inner face means for latching with said ratchet apertures, said face means forming an acute angle relative to the direction of motion of said sleeve member, inclined guide means formed on said bar and sleeve member adjacent said tooth means, said guide means being inclined at an acute angle relative to the direction of motion of said sleeve member, said latter angle being less than the corresponding angle of inclination of said tooth face means, and spring means for urging said latch bar axially outwardly.

6. Operating mechanism comprising an axially-slotted tubular member with an axial row of ratchet-forming apertures formed therein, an elongated operating sleeve member slidable within said ratchet and having a tongue slidable in said slot, a handle at the outer end of said operating member, a unitary latch bar slidably mounted within said operating member and including a button projecting from said handle, tooth means adjacent the axially inner end of said bar normally disposed in said ratchet-forming apertures, inclined guide means formed on said bar and sleeve member adjacent said tooth means, and spring means for urging said latch bar axially inwardly.

7. Mechanism for manually operating a resiliently-loaded device comprising an elongated, fixed ratch member, a device operator slidable along said ratch member, handle means on said operator, a latch member slidable along said operator having manual means for moving the latch member axially inwardly, tooth means on one of said members having face means inclined at an angle of 90 degrees or less relative to the direction of motion of said operator and formed for engaging the other of said members for latching said operator against axially inward motion, cooperating inclined guide means formed on said latch member and said operator, said guide means being inclined at an acute angle relative to the direction of motion of said operator, said acute angle being less than the corresponding angle of inclination of said face means whereby the resilient loading of the operated device cannot unlatch said latch member.

JOHN D. BALDWIN, JR.
FREDERIC D. WYSS.

REFERENCES CITED

The following references are of record in the file of this patent:

UNITED STATES PATENTS

| Number | Name | Date |
|---|---|---|
| 1,564,725 | Topham | Dec. 8, 1925 |
| 1,713,842 | Link | May 21, 1929 |
| 2,136,095 | Baumheckel | Nov. 8, 1938 |
| 2,158,323 | Ericson | May 16, 1939 |
| 2,177,456 | Irving | Oct. 24, 1939 |
| 2,180,215 | Saunders | Nov. 14, 1939 |

FOREIGN PATENTS

| Number | Country | Date |
|---|---|---|
| 516,309 | Great Britain | Dec. 29, 1939 |